United States Patent [19]

Gawler

[11] 4,323,840

[45] Apr. 6, 1982

[54] SWITCHING MODE REGULATOR

[75] Inventor: Glenn B. Gawler, Liverpool, N.Y.

[73] Assignee: General Electric Company, Syracuse, N.Y.

[21] Appl. No.: 194,052

[22] Filed: Oct. 6, 1980

[51] Int. Cl.³ .............................................. G05F 1/56
[52] U.S. Cl. .................................... 323/287; 363/20; 363/56
[58] Field of Search ..................... 315/266, 283, 287; 323/287; 363/18–21, 56

[56] References Cited

U.S. PATENT DOCUMENTS 3,577,065  5/1971  Putzrath et al. ..................... 323/287
4,245,288  1/1981  McLyman ........................ 363/21 X Primary Examiner—William M. Shoop
Attorney, Agent, or Firm—Richard V. Lang; Carl W. Baker; Philip L. Schlamp

[57] ABSTRACT

A switching mode regulator of improved efficiency and reliability is described in which both the turn-on and turn-off transients are controlled. In switching mode regulators, a flyback diode turns off when the transistor switch turns on, but if stored charge keeps the diode on after the transistor switch has come on, very large currents which stress the transistor and represent loss, may result. When the transistor switch turns off, the energy storing inductance required in such supplies to maintain current to the load, causes the voltage across the switch to increase more rapidly than the current is extinguished, thus tending to exceed the ratings of the transistor switch for reverse secondary breakdown. Improved transient performance is achieved by the provision of a novel current transformer which aids in storing energy from the turn-on transient, and which next couples a portion of the stored energy to a capacitor from which the energy is returned to the load in a manner which reduces the rate of change of voltage (dv/dt) applied to the switch at turn-off and precludes reverse secondary breakdown. The whole process is energy conservative. In addition, since switching transistors of lower ratings may be employed, improved performance, reliability, and economy are achieved.

7 Claims, 9 Drawing Figures

FIG. 3C (SECTION VIEW 3A-3A)

FIG. 3D (SECTION VIEW 3A-3A)

$I_C$ ——
$V_{CE}$ ——

SWITCHING MODE REGULATOR

BACKGROUND OF THE INVENTION

1. Field of the Invention

This invention relates to static inverters and more particularly to the class of static inverters known as switching mode regulators. In a switching mode regulator, regulation is achieved by control of the duty cycle of an intermittently operated switch.

2. Description of the Prior Art

In a conventional switching mode regulator, a dc source is coupled through an intermittently operated transistor switch to a current maintaining inductance and a load. The switch is normally conductive for a certain percentage of the time and nonconductive for a certain percentage of time and in the usual case the inductance is made sufficiently large in relation to the load to sustain load current while the switch is nonconductive. In order to provide a suitable current path for inductively sustained current, a flyback diode is provided. The transistor switch may take several forms, but one convenient form, which is not in itself a part of the present invention, is one in which the transistor switch is turned on at a controlled rate by a trigger oscillator and turns itself off by an internal feedback mechanism.

During normal operation of a switching mode regulator, transitions occur where the switching transient turns on before the "catch" or flyback diode has been completely turned off. The delayed turn off is attributable to stored charge in the catch rectifier, and unless protective measures are adopted, the transistor switch may be forced to supply a very large uncontrolled current until stored charge has been removed from the diode. The large current over stresses the transistor. Accordingly, to achieve reliability, either a large or a more costly transistor must be used or some protective measure to control the transistor must be provided. In addition to the stress which occurs when the transistor switch is first turned on, the transistor switches are also subjected to very large and steep voltage changes produced by the release of energy stored in the inductor, when the transistor turns off. If the collector current falls relatively slowly while the voltage across the transistor (Vce) rapidly increases to the full value of the supply potential, the transistor will be subject to both additional loss and the possibility of reverse secondary breakdown. While limiting the voltage change (dv/dt) by snubbing action has been proposed, conventional "snubbers" are not only expensive but lossy.

SUMMARY OF THE INVENTION

Accordingly, it is an object of the present invention to provide an improved switching mode regulator.

It is still another object of the invention to provide a switching mode regulator by improved reliability.

It is a further object of the invention to provide a switching mode regulator of improved efficiency.

It is still another object of the invention to provide an improved switching mode regulator in which high current stresses due to stored charge in the catch rectifier are controlled.

It is still another object of the present invention to provide a switching mode regulator in which the transistor is protected against reverse secondary breakdown.

These and other objects of the invention are achieved in a switching mode regulator for energizing a load from a dc power supply. The regulator has input terminals for connection to a dc supply, a pair of terminals between which a load may be connected, an inductor, an intermittently conducting transistor switch, a "catch" diode, and stress reducing means including a current transformer. The transistor switch has a first (typically the collector) electrode connected to the positive supply terminal. The inductor and load are serially connected in a first path between the second switch electrode (i.e. the emitter) and the negative supply terminal. The catch diode is connected in a second path, shunting the first path, to conduct inductively sustained current through the load when the switch is off.

In accordance with the invention, means are provided to reduce switching stresses on the semiconductor switch during the turn-on current transient which occurs before stored charge is removed from the catch diode. These means comprise a current transformer and reset means. The current transformer has a core and a first and a second winding closely magnetically coupled, with the first winding serially connected in the second path and the second winding serially connected in the first path. When so disposed, current transformer action, during the transient, limits current in the second path to approximate proportionality to the current in the first path, the first path current being limited in turn by the inductance of the inductor. In the process, the transformer transfers transient energy to the inductor and is magnetized in a "set" direction. The reset means operates to transfer the transient energy stored in the inductor through the transformer, shortly after turn-on of the switch, and prior to turn-off of the switch.

In accordance with a further aspect of the invention, the reset means comprises a third winding on the current transformer closely magnetically coupled to the second winding, a second diode, and a first capacitor. The third winding, second diode and capacitor are serially connected to transfer transient energy from the inductor through the transformer to charge the capacitor upon the inversion in voltage across the transformer. The capacitor and the third diode are serially connected between the emitter of the switch and the negative supply input terminal in a suitable polarity to allow the capacitor to discharge and transfer energy back to the inductor upon the turn-off of the switch and the subsequent inversion in voltage across the inductor. The reset means is proportioned to establish the potential to which the capacitor is charged and the rate of transfer of the stored energy to the inductor upon turn-off of the switch. The energy transfer reduces the rate of increase of voltage across the transistor switch and protects it from reverse secondary breakdown.

In accordance with another aspect of the invention, a second capacitor is provided connected in shunt with the first diode to increase the energy derivable from the turn-on transient, and available by discharge of the first capacitor to protect the switch from reverse secondary breakdown.

In the preferred embodiment, the current transformer has the first, second and third windings serially connected in the order recited and wound in the same sense upon a common toroidal core. A first resistance is provided serially connected with the second diode between the connection between said first capacitor and the third diode, and third winding. The third winding, the resistance, the second diode and the third diode are serially connected to form a third path, shunting the inductor and the load in the first path to conduct inductively sustained current through the load upon initial turn-off of the switch and as the first diode becomes conductive. The resistance controls the rate of reset flux in the transformer to insure full reset of said transformer.

In the preferred embodiment, the transistor switch is an NPN conductivity type, with the anode of the first diode and the anode of the third diode being connected to the negative supply terminal, with the cathode of the third diode being connected to the first capacitor, (so that the second diode is connected in the same sense as the third diode in the third path.)

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

FIGS. 3A, 3B 3C and 3D are drawings showing a power transformer suitable for use in the switching mode regulator; FIG. 3A shows an E—E core and the principal power winding T1B associated with the central leg of the core and the emitter connected control winding T1D associated with an aperture at one end of the central leg; FIG. 3B shows the flux distribution useful in understanding a saturation avoidance feature of the power transformer; FIG. 3C shows the base connected control winding T1A associated with the aperture; FIG. 3D shows the trigger winding T1E associated with the aperture; FIGS. 3C and 3D being views taken through sections 3A—3A of FIG. 3A;

DESCRIPTION OF THE PREFERRED EMBODIMENT

Figure 1:
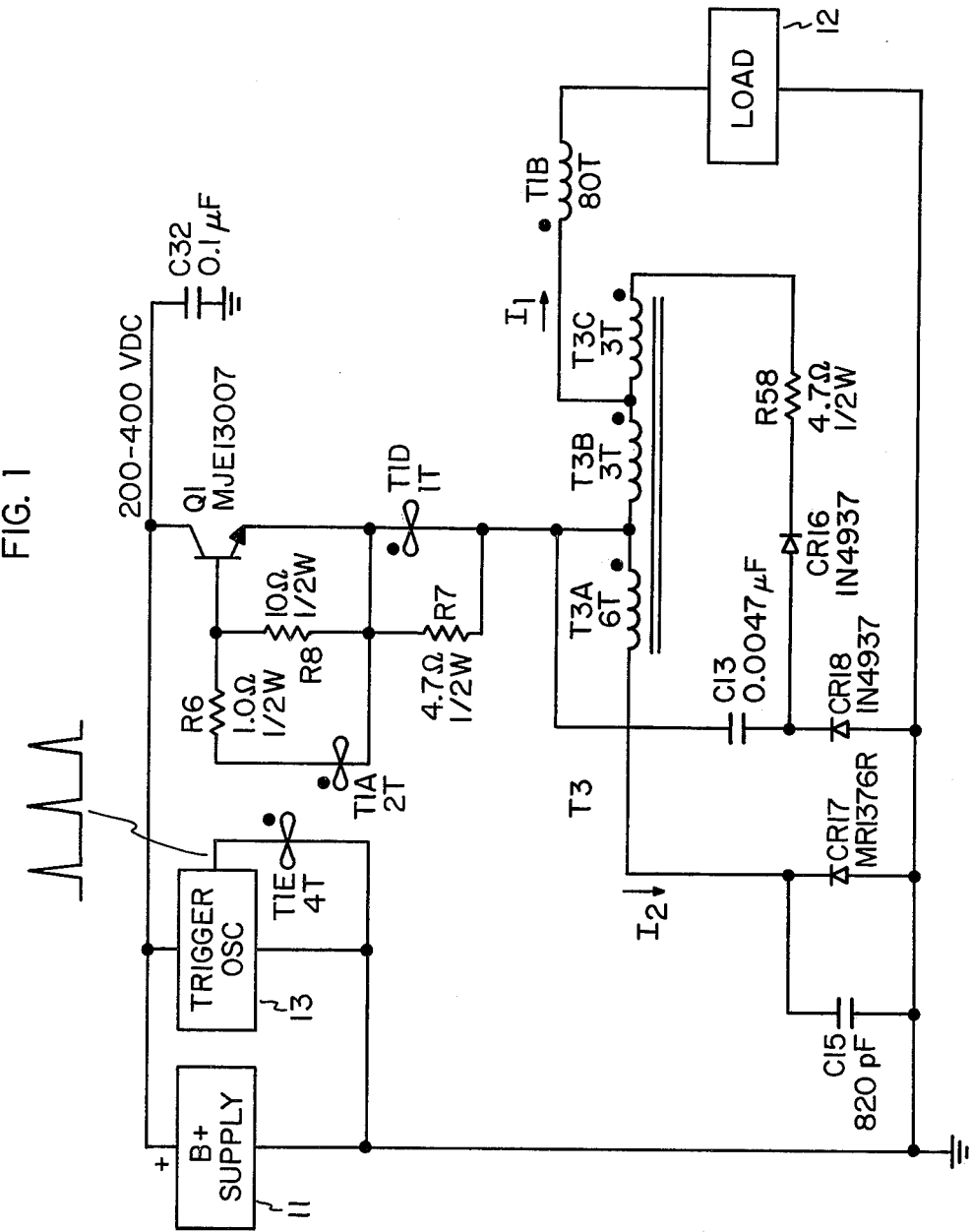
FIG. 1 is an electrical circuit diagram illustrating the novel switching mode regulator in a power supply, typically used for a 200 watt arc lamp.

A switching mode regulator improved in accordance with the invention is shown in FIG. 1. The improvement consists of the provision of novel means for reducing the switching transients and increasing circuit reliability and efficiency. The FIG. 1 embodiment is used to provide power to a 200 watt arc lamp. The circuit of FIG. 1 is simplified in that other means addressed to starting the arc lamp and regulating features particular to that embodiment have not been shown. They are the subject of a separate patent application.

The power supply, as illustrated in FIG. 1, comprises a dc supply 11, the load 12, a gas discharge lamp in this embodiment and the novel switching mode regulator designed to provide dc energization to the load. The elements of the novel switching mode regulator include a transistor switch Q1; the power transformer T1, which has a main power winding T1B of substantial inductance, and control windings T1A, T1D and T1E; a current maintenance or "flyback" diode CR17; a trigger oscillator 13 for controlling the switching rate of the switch Q1; a transient suppressing current transformer T3, having three windings (T3A, T3B and T3C), two additional diodes CR18, CR16, capacitors C13, C15 and C32, and resistances R6, R7, R8 and R58.

The power supply provides regulated dc to a load. The dc supply 11, whose output is typically 300 V (average) at $\frac{2}{3}$ ampere, derives its energy from a 120 V 60 Hz source by means including a voltage doubler. The output of the voltage doubler appears across significant capacities which provide substantial filtering, and as will be shown, the inductance of the power transformer in a switching mode regulator provides additional filtering, since it is designed to sustain current to the load when the regulator switch is non-conductive. The dc supply energizes the switching mode regulator, which in turn supplies regulated dc to the load over a range of voltages less than provided by supply (11) and currents substantially greater than provided by the supply (11).

The switching mode regulator of the present power supply has the conventional elements of a switching mode regulator and except for the additional novel elements to be treated below, which refine the operation, the general mode of operation is conventional. The conventional switching mode regulator includes a switch (e.g. Q1) for interrupting the flow of currents from a dc supply (e.g. 11) to a load (e.g. 12), the duty cycle of the switch being adjusted to achieve regulation. Means (13) are provided for turning the switch on at a given rate, and an inductor (e.g. T1B) is provided whose energy storage prolongs the current applied to the load during the periods that the transistor switch is non-conductive. To permit current to be supplied from the inductor during the off periods of the transistor switch, the flyback diode (CR17) is provided to close the path for inductively supplied current. Ideally, in a switching mode regulator, the transistor switch turns on at the same instant that the flyback diode turns off, and at the instant that the transistor turns off, the flyback diode turns on. These conditions are not true and the consequence are severe transients at both instants which produce the problems which the present invention solves.

The operation of the switching mode regulator will now be treated in greater detail taking up first the transistor switch and next the current paths to the load during the on and off periods of the transistor switch, prior to treatment of the novel refinements which are the subject of the present application.

The transistor switch of the switching mode regulator is designed to be turned on recurrently by the trigger oscillator 13 and to recurrently turn itself off. The trigger oscillator produces steep pulses of typically a few hundred nanoseconds duration on the order of an ampere in amplitude at a 20–50 kHz rate. The output of the trigger oscillator appears in a four turn (i.e. 2 figure 8s) winding T1E which is closely coupled to a two turn (i.e. 1 figure 8) winding T1A coupled to the base of the transistor switch Q1 for affecting switch turn-on. The trigger oscillator is not in itself the subject of the present invention. It may take a variety of forms. A suitable trigger oscillator is disclosed in U.S. patent application Ser. No. 974,253, filed Dec. 28, 1978, Peil, entitled "A Pulse Generator Producing Short Duration High Current Pulses for Application to a Low Impedance Load."

The self turn-off mechanism of the transistor switch Q1 is not in itself the subject of the present invention. It is provided by the winding T1D having its dotted terminal connected to the emitter of Q1 in the current path leading to the load and the base winding T1A already described, acting in concert with the main power winding T1B upon a localized selectively saturable toroidal region of the transformer core. The winding T1D acts as a primary feedback winding, while the base connected winding T1A mentioned above in connection with the trigger oscillator, is the secondary feedback winding. The transformer T1, through a reversal in feedback sense, now to be described, effects self turn-off of the switch.

The power transformer illustrated in FIG. 3, provides the feedback reversal mentioned above, and does so by a mechanism avoiding full saturation of the core. In other words, the arrangement has a saturation avoidance feature by means of which the switching transistor, once turned on by a trigger pulse, continues to conduct strongly with the feedback windings T1D and T1A initially providing strongly regenerative feedback action until core saturation is approached. When the approach of saturation is sensed, the sense of the feedback is reversed and the transistor is turned off before full core saturation occurs.

Figure 3A:
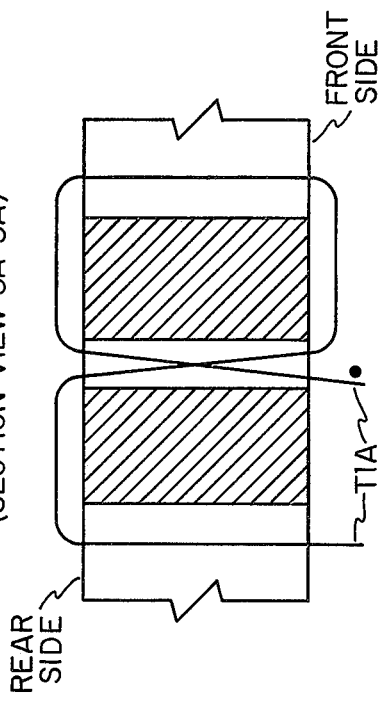
Figure 3A:
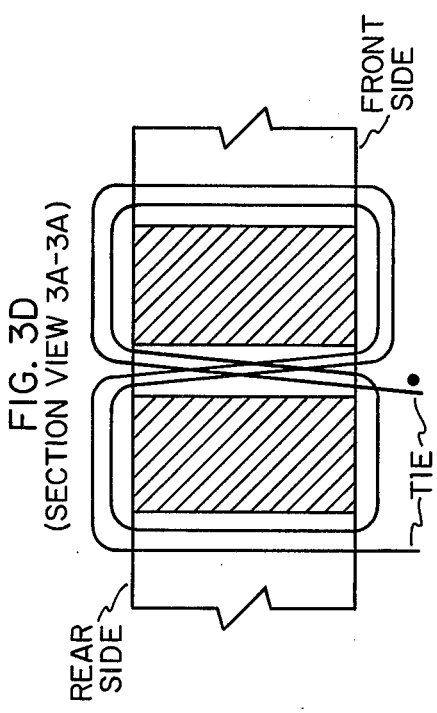
Figure 3A:
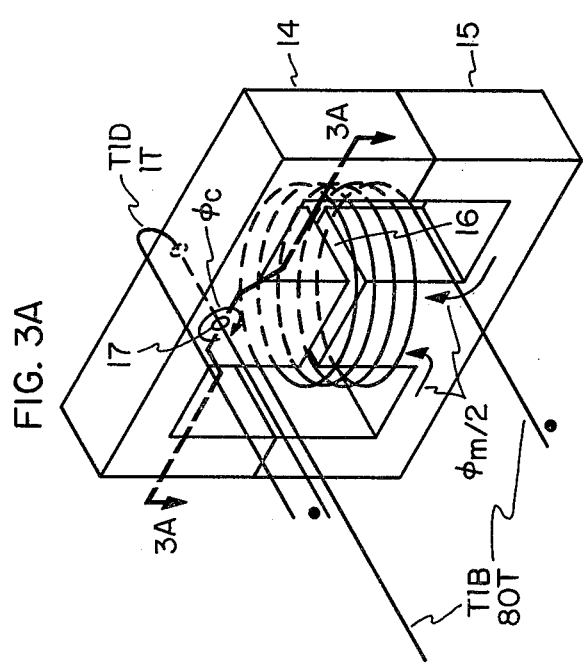
Figure 3B:
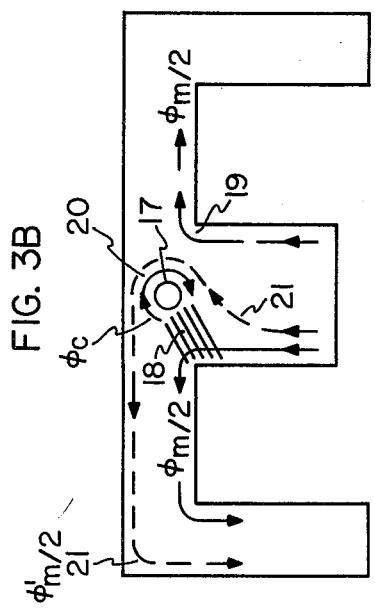

The transformer T1, which provides the saturation avoiding reversal of feedback is illustrated in FIGS. 3A, 3B and 3C. FIG. 3A illustrates the mechanical construction of the overall transformer T1, including the placement of the windings T1D and T1B. FIGS. 3B and 3C are auxiliary windings showing the placement and construction of the windings T1A and T1E, respectively. The illustrated transformer is not, in itself, the subject of the present application. The illustrated transformer is suitable for use in the present embodiment, but may be replaced by other transformers having a similar saturation avoidance feature. Suitable transformers are shown in the U.S. Pat. No. 4,202,031, Hesler et al, or the copending applications Ser. No. 139,946, filed Apr. 14, 1980, (a continuation-in-part of Ser. No. 969,381 filed Dec. 12, 1978, now abandoned) of Peil et al, entitled "A Transformer for Use in a Static Inverter"; and Ser. No. 028,405, filed Apr. 9, 1979 (continuation-in-part of Ser. No. 875,337, filed Feb. 6, 1978, now abandoned) by Harris, Schmitz Peil and McFadyen, entitled "A Transformer for Use in a Static Inverter". The invention is also applicable to switching mode regulators not having a saturation avoidance feature.

As seen in FIGS. 3A, 3B and 3C, the windings T1A, T1B, T1D and T1E are assembled on a pair of "E" cores 14, 15. The "E" cores are assembled to form a composite core having a rectangular figure "8" configuration, with an air gap 16 at the center core joint. The main power winding T1B, of 80 turns, is wound about the central leg of the core. As illustrated, assuming current flow into the dotted lower end of the winding T1B and out of the upper end, the main flux $\phi_m$ flows up the center leg and branches equally at the ends of the center leg. Half the main flux ($\phi_{m/2}$) pursues a counterclockwise course around the left loop of the composite core and the other half of the main flux ($\phi_{m/2}$) pursues a clockwise course around the right loop of the composite core.

The control windings T1D, T1A, T1E of the power transformer are wound through an aperture 17 provided in the "E" core near the upper end of the center leg. As illustrated in FIGS. 3A, 3C and 3D, the aperture is small in relation to the cross section of the core while being large enough for insertion of the three control windings (i.e. seven conductors). The aperture is located on the center line of the center leg close to the root of the center leg. The positioning of the aperture creates a region above the aperture which is free or substantially free of the main flux, absent saturation effects and provides an equal distribution of main ($\phi_{m/2}$) flux on both sides of the aperture.

The control windings T1D, T1A and T1E are wound as follows. The emitter connected end of the one turn primary feedback winding T1D enters the aperture 17 on the front face of the core. The end which exists on the back face is for connection to the upper terminal of the main power winding T1B in the sense illustrated by the dot. It embraces the upper section of a three section toroid, visualized as surrounding the aperture 17. The base connected secondary feedback winding T1A is a single figure "8" winding wound through the aperture 17 and embracing the lower left and lower right sections of the toroid visualized as surrounding the aperture 17. The sense of the base winding is illustrated by the dot in FIG. 3C. The control winding T1E which couples the trigger pulse from the trigger oscillator to the base of the transistor switch Q1 via the base winding T1A is illustrated in FIG. 3D. It is a double figure 8 winding also wound through the aperture 17 and embracing the lower left and lower right sections of the toroid.

The control windings T1D and T1A, considered independently of the main power winding T1B, form a current transformer. The primary winding of the current transformer is a single turn winding T1D coupled about the virtual toroid. The secondary winding of the feedback current transformer is the figure "8" winding T1A, whose two windings aid in respect to flux circulating in the toroid about the aperture 17. When no portion of the core is saturated, the core of the feedback current transformer is of very low reluctance. The outer boundaries of the toroid are the adjacent boundaries of the upper leg and center leg of the composite "8" core, which may be further visualized as bounded by a circle centered on the aperture, and passing through the corners of the winding slots and tangential to the upper core surface. The virtual toroid thus consists of a first section 18 connecting the upper half of the central leg to the left half of the upper leg and provides a path for both main flux in the left hand loop of the "8" core and for flux circulating in the toroid, a second section 19 connecting the upper half of the central leg to the right half of the upper leg and providing a path for both the main flux circulating in the right hand loop of the "8" core and for flux circulating in the toroid; and a third section 20 lying in the upper leg and interconnecting the left and the right halves. Absent saturation or hole asymmetry, very little of the main flux and only toroidal flux flows through the third section 20 and the main flux flows in equal amounts and opposite senses about the toroid and thus produces no signal in the figure 8 base winding T1A.

Operating together, the three windings T1B, T1D and T1A provide the mechanism for providing conduction aiding feedback prior to the attainment of a prescribed level of flux in the core, and conduction inhibiting feedback afterwards. In FIG. 3B the flux directions are shown. From inspection, it may be seen if appreciable current flows in both windings T1B and T1D, that the highest flux concentration should be expected to occur where flux from each winding is present and adds. More particularly, the flux ($\phi_c$) from the primary control winding T1D is confined primarily to the sections 18, 19, 20 of the virtual toroid. The flux ($\phi_m$) from the main power winding T1B divides in halves ($\phi_{m/2}$) and flows through sections 18 and 19 but generally avoids section 20. Since the windings T1D and T1B are serially connected, current will flow in the same sense in both and will increase in both together. As a result, the relative senses of the main and circulating fluxes will be fixed. In section 18, the two fluxes $\phi_{m/2}$ and $\phi_c$ will add and the flux density will be larger. In section 19, the main flux and circulating flux will be in mutual opposition and partially cancel ($\phi_{m/2} - \phi_c$), resulting in a lower total flux. In the third section 20, primarily circulating flux ($\phi_c$) will be present. Thus, as the current increases, more flux will occur in the section 18 than in the sections 19 and 20. As the current in the windings continues to increase, section 18, which has the highest flux, may be expected to saturate first.

When section 18 saturates, additional incremental flux seeks out other paths, and alters the control relationships between the primary (T1D) and secondary (T1A) feedback windings. Prior to saturation of section 18, the secondary winding T1A, as explained earlier, is coupled to circulating flux $\phi_c$ attributable to the primary control winding T1D, and uncoupled to the main flux $\phi_m$. The sense of the drive applied by windings T1D and T1A to the base of the transistor Q1 is conduction aiding and assists in turning on the switch Q1 more strongly.

When section 18 saturates, the core coupling between the primary and secondary control windings is substantially reduced and the stage is set for drive reversal. Saturation of section 18 introduces a virtual air gap into the toroid and increases the reluctance in the flux path, which decreases the coupling between the control windings T1D and T1A. At the same time, any further increases in transistor current will cause an increase in the main flux, and the main flux will tend to increase but no longer according to the original distributions.

Drive reversal occurs as the main flux increase is redistributed during saturation of section 18. Since the flux path through section 18 is of high reluctance, following saturation, the incremental main flux normally pursuing a path through 18 will seek out the next lower reluctance path as an alternate. The alternate path (21) involves going around the aperture 17 to avoid the region 18 and going through the unsaturated section 19 and the neutral section 20. When this occurs, the main flux $\phi_m$ no longer increases in section 18 in an amount equal to the increase in section 19. The new increments of main flux will flow in a sense opposite to the circulating flux (due to T1D) in the sections of the toroid, and be coupled preferentially to the rightmost loop of the base winding (T1A). As a consequence of this redistribution, the rate of change of flux coupled to the base winding (T1A) from the main power winding (T1B) will first oppose that due to the primary control winding T1D and then exceed it in the reverse direction. When the rate of change of flux in section 19 of the toroid exceeds that in section 18, the sense of the feedback applied to the secondary feedback winding T1A will reverse. Thus, after a predetermined flux density has been achieved, causing saturation of section 18, the sense of the base drive inverts to one inhibiting further transistor conduction. One may regard the incremental main flux as now being coupled to the secondary feedback winding (where previously it had been uncoupled), in effect creating a second transformer in which the primary winding is the main power winding T1B and the secondary winding is the secondary control winding T1A.

The feedback sense reversal just described occurs upon partial saturation of the core but before full core saturation. The reversal turns off the transistor before full core saturation, and thus precludes the transistor from experiencing the stresses that full core saturation and a sharp reduction in inductive impedance of the winding T1B.

The feedback action produced by the control windings is quite positive at the moment of sense reversal, and is moderated in this embodiment by the presence of the resistances R6, R7 and R8 which are connected as follows. The base winding T1A has a dotted terminal serially connected through the 1 ohm current limiting resistance R6 to the base of the transistor Q1. In addition, a 10 ohm resistance R8 is connected in shunt with the input junction of the transistor Q1 to protect against over voltage. A second 4.7 ohm resistance R7 is connected in shunt with the primary feedback winding T1D.

The trigger winding T1E and base winding T1A form a transformer for coupling the trigger pulse from the trigger oscillator 13 to the switching transistor Q1 and turning it on. The virtual toroid surrounding the aperture 17 also forms the core of the trigger transformer. It functions in a manner similar to the initial operation of the feedback transformer involving windings T1D and T1A. Because the flux levels are low in the core when the transistor switch is first turned on, the trigger transformer functions without saturation effects.

Having treated the operation of the transistor switch, the current paths to the load during the on and off periods of the transistor switch will now be taken up. The current supplied from 11 to the load 12 passes serially through the NPN transistor switch Q1, whose collector is coupled to the positive terminal of the supply, the feedback winding T1D of the power transformer, (the dotted terminal of which is coupled to the emitter of the switching transistor Q1), a second winding T3B of the current transformer T3, the undotted terminal of which is coupled to the feedback winding T1D. The main power winding T1B (the dotted terminal being connected to the dotted terminal of winding T3B) connects to the positive load terminal. This current path is completed by the connection of the negative supply terminal and the negative load terminal to the common or ground bus. In common with the other switching mode regulators of this general class, a "flyback" diode (CR17) is provided for allowing current to continue to flow in the load during the interval that the transistor is non-conductive. The path of flyback current starting from the anode of diode CR17, connected to the ground bus, sequentially includes the first current transformer winding T3A whose undotted terminal is coupled to the cathode of diode CR17, and the primary winding T3B, whose undotted terminal is connected to the dotted terminal of winding T3A, the main power winding T1B, and the positive and negative terminals, respectively, of the load, the latter being connected to the ground bus and thus completing the path for flyback current.

As earlier noted, the two current paths through the load may co-exist momentarily, as for instance, when the transistor switch Q1 turns on and the rectifier (CR17) continues to conduct until stored charge is removed. At this instant, high instantaneous currents are developed in the transistor switch. In addition, when the inductance of the power transformer becomes a source of energy to maintain current in the load when the transistor switch turns off, very fast voltage reversal may occur, causing reverse secondary breakdown in the transistor switch if the transistor current does not stop fast enough. These dangers are reduced in accordance with the invention by the provision of the current transformer T3 and the associated components including capacitors 13, 15, diodes 16 and 18, and the resistance R58, whose connections and operation will now be explained.

Figure 4:
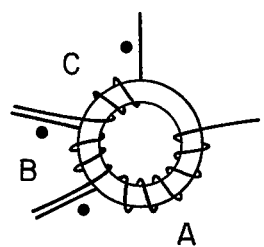
FIG. 4 is a drawing of the novel current transformer T3 used in accordance with the invention to reduce the transients which occur during turn-on and turn-off of the switch.

The means used to reduce switching stresses on the transistor are interconnected as follows. The current transformer T3 is illustrated in FIG. 4. It consists of three windings T3A, T3B and T3C all wound in the order recited and in the same sense upon a toroid. The toroid is 0.62" in outer diameter, 0.35" in inner diameter and is of a ferrite material (557036 Stackpole) which is suitable for use at above audible operation frequencies employed. The second winding T3B is of three turns and serially connected in the path from the transistor switch through the main power winding T1B and the load. This winding, as will be shown, acts as a primary winding of a current transformer to which the windings T3A and T3C are closely coupled and tend to fix current ratios. The winding T3A is of six turns with the dotted terminal connected to the undotted terminal of the winding T3B and the undotted terminal of winding T3A being connected to the cathode of the flyback diode CR17. The anode of diode CR17 is connected to the common supply terminal. A capacitor C15 of 820 picofarads is connected across the rectifier CR17. The winding T3C has its undotted terminal connected to the dotted terminal of the winding T3B and its dotted terminal connected to one terminal of resistance R58 of 4.7 ohms. The other terminal of resistance R58 is connected to the cathode of diode CR16, the anode of which is coupled to the cathode of diode CR18 and a first terminal of capacitor C13. The circuitry is completed by the connection of the anode of diode CR18 to the common supply terminal and the connection of the other terminal of capacitor C13 to the dotted terminal of winding T3A.

Figure 2:
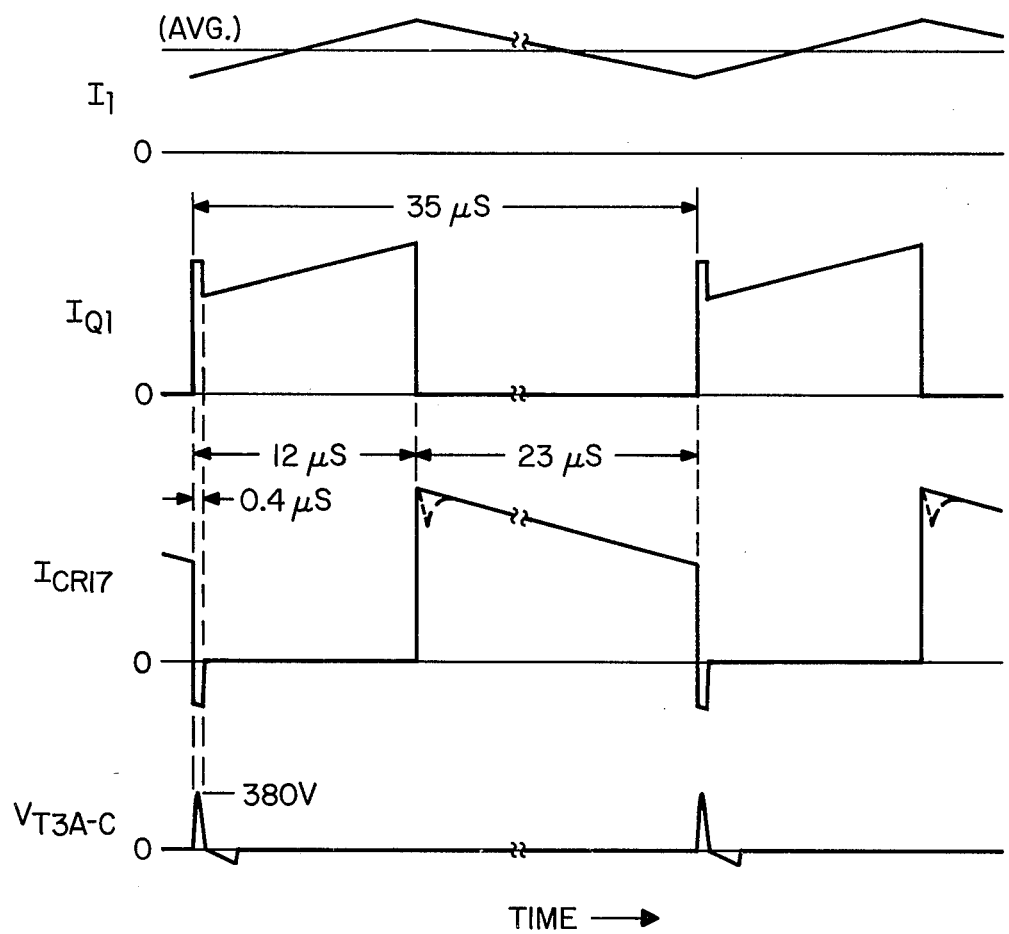
FIG. 2 contains four waveforms useful in explaining the operation of the switching mode regulator illustrated in FIG. 1.

A more detailed explanation of the operation of the improved switching mode regulator will now be undertaken making reference to the waveforms illustrated in FIG. 2. The transistor switch has a duty cycle of about 34 percent with a conduction interval of 12 microseconds in a period of 35 microseconds in the illustrated embodiment. The uppermost waveform in FIG. 2 illustrates the load current ($I_1$). Current is maintained to the load at all times either by conduction of the transistor switch Q1, which represents the shorter duration upward sloping portion of the current waveform or by the release of energy from the inductor (T1B), which represents the longer duration downward sloping portion of the current waveform. The second waveform shows the current of the transistor switch alone, with a current spike of about 0.4 microseconds duration occurring at the beginning of conduction. Except for the spike, the transistor current is the load current illustrated in the uppermost waveform during the switch conduction. The transistor switch is nonconductive between conduction periods. The third waveform is that of current supplied to the load from the inductor (T1B) via the flyback diode (CR17). At the instant that the switching transistor turns on, stored charge in the diode CR17 allows the diode to continue to conduct for a brief instant, and this conduction accounts for the reverse diode current transient shown in the third waveform. It is the same current transient shown for the transistor switch and it follows a current path avoiding the load, and thus represents a potential loss of energy. The diode reverse current transient continues until stored charge is removed, after which the diode remains nonconductive for the balance of the switch conduction period. The diode current waveform then steps up sharply as the diode conducts and the switch turns off. During the off period of the switch, the diode conducts with the gradually decreasing current mentioned earlier in connection with the uppermost graph. The turn off of the switch also poses a problem, not illustrated by the waveforms of FIG. 2, of exceeding the ratings of the switching transistor for reverse secondary breakdown when the voltage across the switch falls too steeply. This matter will be taken up subsequently.

The fourth waveform is that of the voltage across the winding T3A coupled to the flyback diode. During the initial transient of switch conduction, the voltage across the winding T3A swings to a maximum of about 380 volts positive. After the transient, the voltage across the winding reverses to about 150 volts negative, and then returns to near zero, holding this value until the switch turns off. (As will be seen, the volt time areas of the positive and negative portions of the waveform are equal.)

As explained above, the undesired current transient occurs when the transistor switch (Q1) begins to conduct with the flyback diode (CR17) still conducting. This establishes a current path in which a non-limited current could occasion very significant losses. How this would occur in a conventional switching mode regulator may be appreciated by assuming that the elements CR16, and the current transformer T3 (which limit the current in this path) are absent from the illustrated configuration. After being turned on, the switch (with the above elements assumed to be absent) conducts current between the DC supply terminal in one path through the main power winding (T1B) and the load 12, and in a second path directly to ground through the diode CR17 in a sense to remove stored charge. Before the stored charge has been removed from the diode, the cathode of CR17 is near ground potential, and while the transistor Q1 is supplying the charged removal current, its collector voltage is at B+ (380 V) and its emitter at zero. In other words, the fully supply potential would appear across two highly conductive semiconductor devices, effectively presenting a "short circuit". Without some means of limiting the current during this interval, the losses and stresses would be intolerable.

With the elements CR16 and T3 present, the harmful effect of the transient on the devices is prevented by limiting the current and at the same time the energy that would be lost is saved. In accordance with the invention, when transistor Q1 turns on, the diode CR17 is forward biased as before and the source potential (Vcc)

is now applied across the winding T3A in series with the parallel combination of diode CR17 and capacitor C15. Assuming that the load current ($I_1$) remains substantially constant during the interval (which it must due to the large inductive impedance and energy storage of the winding (T1B)), the current in winding T3A ($I_2$) is held to a proportion equal to the turns ratio to winding T3B times the load current ($I_1$):

$$I_2 = (N_B/N_A) I_1 = \tfrac{1}{2} I_1 \tag{1}$$

This relationship holds so long as the two windings T3 are closely coupled, a condition which exists so long as the core is unsaturated. Thus, a non-limited harmful current surge is prevented, and the energy that it represents is conservatively stored in the capacitor C15 and via the transformer T3, on inductor T1B.

The total transistor current in Q1, assuming that current transformer action is taking place between T3B and T3A, is 3/2 $I_1$. The energy taken from the supply in the flyback circuit (C15, CR17, T3) may be expressed as follows:

$$\int_0^{\Delta t} V_{Cr17} \cdot I_2 \cdot dt = C_{15} \text{ energy} + C_{r17} \text{ loss} \tag{2}$$

where $\Delta t$ is the period of the transient, (e.g. 0.4 microseconds). The energy taken from the supply and momentarily stored in T1B via the current transformer T3 is:

$$\int_0^{\Delta t} (V_{CC} - V_{Cr17}) I_2 \cdot dt = T3 \text{ (set energy)} \tag{3}$$

Both energies are removed from the supply, and in effect divert energy that might have gone directly into the field of the inductor T1B, for release to the load.

The "set" and "reset" of the current transformer T3 under the influence of the initial current transient is used as a step to achieving a second advantage. The reset energy, which is potentially available when stored charge is sensed and current $I_2$ goes to zero, is supplied to the capacitor C13 and used to protect the switch Q1 from reverse secondary breakdown. During the starting transient the current transformer is "set" to the energy level indicated in expression 3. The T3 "reset" process stores energy in the form of charge on the capacitor C13 and charging occurs immediately after the transient (2 microseconds). It should be complete before switch conduction ends.

The storage of energy in the capacitor C13 occurs in the following manner: The starting transient has sufficient volt time area to set the core of the current transformer to a significant fraction of forward saturation. When the diode conduction terminates as stored charge is exhausted, an inductive surge occurs reversing the voltage across winding T3C of the current transformer, and causing current to flow in an alternate path now provided by diode CR16 through winding T3C. As before, the load current remains substantially constant in the transformer T1B and since current T3A is terminated, the collapsing field forces a current in winding T3C into the turn ratio proportionality ($N_c/N_b$) to the load current in winding T3B. That load current continues to be constrained to be substantially constant, and thus acts as a constraint on the current into winding T3C. The constraint continues until the current transformer is driven into reset and loses control. The sense of the currents in winding T3B and T3C are into the node at the dotted terminal of winding T1B and each in the sense to supply one-half of the load current during the period of effective current transformer action:

$$I_{T3C} + I_{T3B} = I_1 \tag{4}$$

$$I_{T3C} = I_{T3B} = \tfrac{1}{2} I_1 \tag{5}$$

The "reset" current through diode 16 charges the uppermost terminal of the capacitor 13 positively and the terminal coupled to the anode of diode CR16 negatively. The operation of "setting" the current transformer is substantially complete after 0.4 microseconds of the switch conduction interval. The reset is normally accomplished after 2 microseconds, well within the twelve switch conduction interval. The effect of the "set" action followed by "reset" action is to make the volt time area for "set" and "reset" substantially equal. This action substantially prevents the current transformer from being incremented to saturation in the "set" direction where it would lose its ability to absorb and release the energy from each switching transient. (As will be seen, reset is further supplemented by a "hard reset" action involving both diodes CR18 and CR16.)

Figure 5:
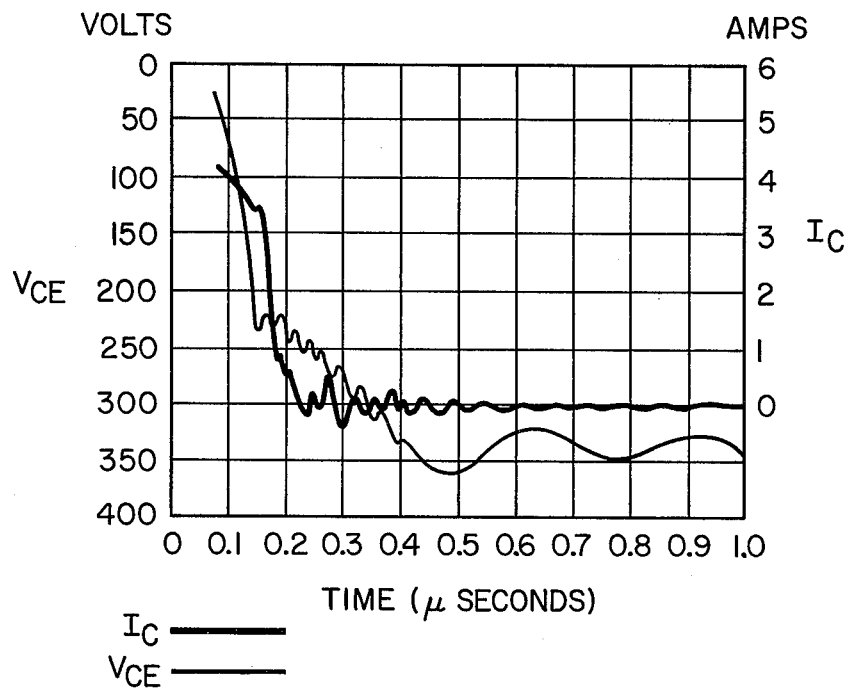
FIG. 5 contains two actual waveforms useful in explaining the operation of the switching mode regulator in respect to the "snubbing action" designed to limit losses and protect the switching transistor from reverse secondary breakdown when it is being turned off.
Figure 6:
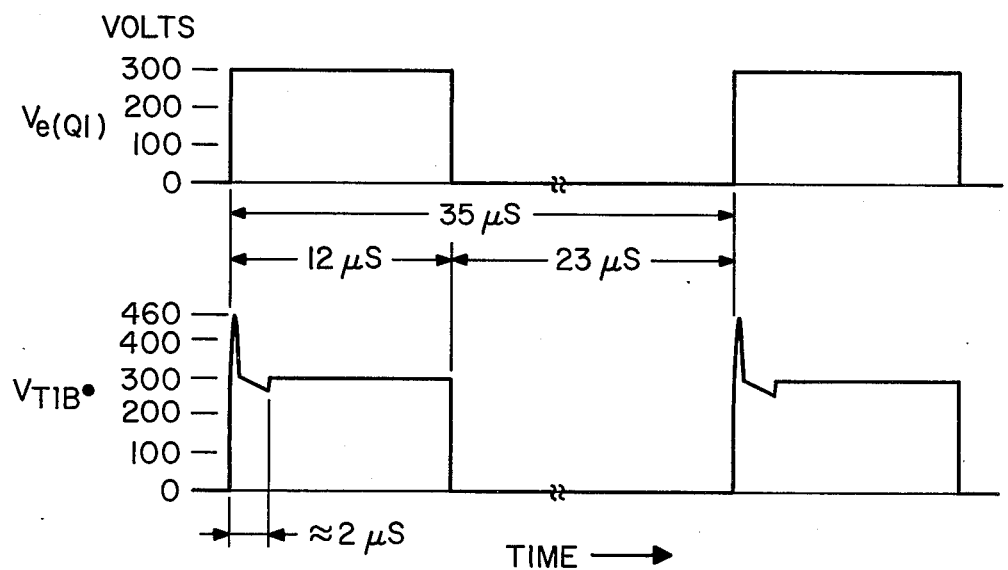
FIG. 6 contains two waveforms useful in explaining the energy conservation transfer of transistor energy from the power winding (T1B) through the current transformer (T3) to a capacitor.

At this point in the operation, the capacitor 13 is charged. The current transformer T3 is in a reset condition and the transistor switch which has been conducting until this instant is turned off. The turn off mechanism of the transistor switch is accomplished by the control means earlier described associated with the transformer T1. The onset of current decrease in the switch causes the voltage across the winding T1B to reverse and to commence the application of successively higher voltages across the switching transistor (Vce). The voltage on the emitter falls sharply until it reaches the voltage stored on the capacitor C13. At that point, the diode CR18 becomes forward-biased and the precipitous fall in emitter voltage is arrested by the "snubbing" effect of the capacitor C13. The emitter voltage now falls at a slower rate consistent with the more gradual discharge of capacitor C13. The discharge path is through winding T1B to the load and thus represents a return of energy originally stored, via the current transformer, in C13 to the T1B inductance and the load. (In other words, the process of protecting against the transient effects is largely energy conservative.) The operation, which prevents the transistor voltage (Vce) from immediately reaching the full reverse voltage available across the winding T1B is characterized as a "snubbing action". The function of the "snubbing" is to prevent the reverse secondary breakdown ratings of the transistor switch from being exceeded. These ratings are normally expressed gradually and roughly entail products of the transistor current and collector-emitter voltage during turn off. Assuming a given, relatively gradual sloping profile of reduction in current in a transistor during turn off, a very rapid application of a high voltage across the switch, requires an increased reverse secondary breakdown rating. Snubbing is herein provided, slows down the increase of the collector emitter voltage to lower values and permits the use of lower rated transistor switches. The waveshapes illustrating the snubbing action in the present embodiment are provided in FIG. 5. The inverse voltage waveform ($V_{ce}$) is drawn superimposed upon the current waveform ($I_c$) and the time is shown in one-tenth microsecond intervals. Considering the voltage waveform, the abscissa at the top of the page is zero volts and is marked in 50 volt intervals. Following the $V_{ce}$ waveform, it may be seen that the voltage falls approximately— 230 volts in approximately one-tenth microsecond before the snubber commences operation. The snubber then produces a more gradual reduction in the reverse voltage to approximately—370 volts in a time period of approximately 0.325 microseconds. The transistor current ($I_C$) is shown superimposed on the same graph. The time coordinates are as before. The zero point for collector current is two divisions from the bottom of the graph at a scale of one ampere per division. In the graph, the current peak is approximately 4 amperes at the point where the graph commences and falls to zero in approximately two-tenths of a microsecond. With the present device, the illustrated snubbing performance provides reasonable life for a transistor having the ratings of the indicated power transistor, and does so without the expense of large operating losses in the snubbing circuitry.

The circuit values indicated in FIG. 1 are satisfactory for a 200 watt arc lamp load running at 0.6 amperes at 350 volts dc. The resistance R58 determines the length of time that CR18 acts as a catch rectifier, controlling the rate at which T3 flux goes to "hard reset", and therefore the time before diode CR17 takes over.

The capacitor C15, which is connected in shunt with the diode, affects the duration of the setting interval, and also the energy available for setting the current transformer T3. The larger the capacitor, the larger the energy in the current spike ($\Delta t$) and the larger the stored set energy:

$$W_{set} = \int_0^{\Delta t} (V_{cc} - V_{CR17}) I_2 \, dt \tag{6}$$

The set energy ($W_{set}$) is then transferred to C13 for snubbing:

$$W_{set} = \tfrac{1}{2} C13 (V_{snub})^2 \tag{7}$$

Thus, increasing C15 increases both the set energy and that stored in C13.

In the snubbing action, the slope of the snubbing voltage $dV_{snub}/dt$ is inversely proportional to the value of C13, while the initial value at which snubbing occurs is directly proportional to C15.

The components R7 and C32 provide a low impedance in the Q1 current path to minimize ringing.

After snubbing, and capacitor C13 is discharged, current continues to flow through diodes CR16 and CR18 and brings the transformer T3 from a normal reset to a hard reset. The voltage equations during this interval, assuming current transformer action (which is a pessimistic assumption), are as follows:

$$2V_D + I_C R58 - V_C = V_B + V_A + V_D; \tag{8}$$
$$V_B = V_C; V_A = 2V_C$$

where $V_D$=the diode drops of CR16, CR18 or CR17; $V_A$, $V_B$, $V_C$=voltage across the T3 windings: $I_C$ is the current in winding T3$_C$.

$$V_C = \tfrac{1}{4}(V_D + I_C R58) \tag{9}$$

$$I_C = 3I_A; I_A + I_C = I_1; I_C = \tfrac{3}{4} I_1$$

where $I_1$=load current, $$V_C = \tfrac{1}{4}(V_D + \tfrac{3}{4} I_1 R58) \tag{10}$$

This voltage $V_C$ brings on "strong" reset of T3. AT "strong reset" the voltage across all windings ($V_A$, $V_B$ and $V_C$) is zero and the branch CR17 takes all of the load current.

The above equations verify that to the extent that the current transformer is not already fully reset, the current path provided by the diodes CR18, CR16, R58 and winding T3C provide a properly sensed magnetization for achieving "hard" reset. The equation also indicates that the effect of the resistance 48 is to increase the speed of hard reset. The small energy exchange occurring at the beginning of flyback produces a slight rounding of the starting corner of the flyback diode conduction curve as illustrated in the dotted outline shown in the third waveform of FIG. 2.

The switch turn-off—flyback diode turn-on function is relatively complex. As switch turn off is beginning, the growth of potential across the switch is first allowed to fall steeply, then the fall is checked and allowed to fall more gradually as charge is removed from the capacitor C13. When all charge is removed, current flow continues through diodes CR18 and CR16 for a short interval as hard reset is achieved. When the current transformer action has been completely extinguished by full saturation of the current transformer core, the differential voltage drop occasioned by the second diode in the third branch and the resistance R58 now reduces the current in the third branch in respect to normal flyback current in the second branch through diode CR17 and normal flyback path becomes solely operative.

Through the operation of the circuit, small amounts of energy are required in magnetizing the current transformer whereas relatively large amounts of energy are required in magnetizing the inductor (T1). The inductor is operated in a condition in which there is always substantial energy stored in the (T1) field and the long intervals between switch conduction during which energy is coupled to the load never exhaust that energy. Since the load is deriving energy from the field during the nonconduction periods, the exchange of energy between the capacitor C13 and the transformer T3 may best be characterized as interim states in which energy that would otherwise be applied to the field of the transformer T1 is momentarily diverted and then later returned. The diversion of the energy is of substantial efficiency, as is its return for storage in the main inductor (T1B) field, and in consequence utilization by the load is also efficient. Because the magnetizing effect of the current transformer is small relative to that of the transformer T1, it may generally be regarded as "transparent" in that the amount of energy stored is small and is reflected either immediately or after short delays in the energy stored in the transformer T1.

The invention is not restricted to the illustrated embodiment. While the invention has been shown in a circuit embodying NPN transistors, it should be evident that PNP devices may also be employed. The circuit may be rearranged, assuming that an NPN transistor is employed, with the transistor switch and the balance of the circuit interchanged across the dc supply terminals. In other words, the flyback diodes may be coupled to the positive terminal and the collector of the transistor (an NPN) to the current transformer and its emitter to the negative or common supply terminal. In addition, while convenience normally dictates that the load be coupled to the common terminal, one may interchange the serial order of the winding T1B of the transformer with the load 12. As earlier stated, the invention may be embodied with transistor switches in general and is not restricted to circuits in which the inductor (T1B) is a portion of a transformer having saturation control features.

What is claimed as new and desired to be secured by Letters Patent of the United States is:

1. A switching mode regulator for energizing a load from a dc power supply comprising:
   A. a first and a second input terminal for connection to said dc supply,
   B. a pair of terminals between which a load may be connected,
   C. an inductor,
   D. an intermittently conducting transistor switch having a first and a second electrode; said first switch electrode being connected to said first input terminal;
   said inductor and said load terminals being connected to provide serial connection of said inductor and said load in a first path between said second switch electrode and said second input terminal;
   E. a first diode connected in a second path, shunting said first path, to conduct inductively sustained current through said load when said switch is off;
   F. means to reduce switching stresses on said semiconductor switch during the turn on current transient when stored charge is removed from said first diode comprising:
      (1) a current transformer having a core and a first and a second winding closely magnetically coupled, with said first winding serially connected in said second path and the second winding serially connected in said first path,
      current transformer action, during said transient, limiting current in said second path to approximate proportionality to said first path current, said first path current being limited by the inductance of said inductor, said transformer transferring transient energy to said inductor and being magnetized in a set direction, and
      (2) means for substantially resetting said transformer by the transfer of transient energy from said inductor through said transformer prior to turn off of said switch.

2. A switching mode regulator as in claim 1 wherein said reset means comprises:
   A. a third winding on said current transformer, closely magnetically coupled to said second winding,
   B. a second and a third diode, and
   C. a first capacitor,
   said third winding, said second diode and said capacitor being serially connected to transfer said transient energy from said inductor through said transformer to charge said capacitor upon the inversion in voltage across said transformer as said stored charge is removed, substantially resetting said transformer, and
   said capacitor and said third diode being serially connected between said second switch electrode and said second input terminal, respectively, to allow said capacitor to discharge and transfer energy back to said inductor upon the turn off of said switch and the subsequent inversion in voltage across said inductor.

3. A switching mode regulator as in claim 2 wherein said reset means is proportioned to establish the potential to which said capacitor is charged and the rate of transfer of the stored energy represented by said charge to said inductor upon turn off of said switch, to reduce the rate of increase of voltage between said first and second switch electrodes and protect said switch from reverse secondary breakdown.

4. A switching mode regulator as set forth in claim 3 wherein
   a second capacitor is provided connected in shunt with said first diode to increase the energy derivable from said turn-on transient, and available by discharge of said first capacitor to protect said switch from reverse secondary breakdown.

5. A switching mode regulator as set forth in claim 4 wherein
   said current transformer has said first, second and third windings serially connected in the order recited and wound in the same sense upon a common toroidal core.

6. A switching mode regulator as set forth in claim 5 wherein
   a first resistance is provided serially connected with said second diode between the connection between said first capacitor and said third diode, and said third winding; said third winding, said resistance, said second diode and said third diode being serially connected to form a third path, shunting said inductor and said load in said first path, to conduct inductively sustained current through said load upon initial turn off of said switch and as said first diode becomes conductive, said resistance controlling the rate of reset flux in said transformer to insure full reset of said transformer.

7. A switching mode regulator as set forth in claim 6 wherein
   said first input terminal is for positive polarity, said second input terminal is for negative polarity,
   said transistor switch is an NPN conductivity type, said first switch electrode is the collector and said second switch electrode is the emitter,
   said one first diode electrode is the cathode and said other first diode electrode is the anode, and
   the anode of said third diode is connected to said second input terminal, the cathode of said third diode is connected to said first capacitor, said second diode is connected in the same sense as said third diode in said third path.

* * * * *